UNITED STATES PATENT OFFICE 2,394,257

DERIVATIVES OF GLYCOLS

Robert P. Parker, Somerville, and John J. Denton, Bound Brook, N. J., assignors to American Cyanamid Company, New York, N. Y., a corporation of Maine No Drawing. Application July 3, 1944,
Serial No. 543,428

10 Claims. (Cl. 260—571)

This invention relates to new aminoaryl derivatives of glycols having from two to four carbon atoms. The compounds may be represented by the following formula:

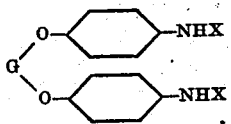

in which G is the residue of a glycol having not less than two and not more than four carbon atoms and X is a paranitro- or paraminophenyl radical. The modification of the invention in which X is paraminophenyl is the more important one as those amino compounds are capable of diazotization and coupling with various coupling components, particularly ice-color coupling components which make possible new blue to violet pigments and dyes exhibiting superior fastness properties such as fastness to light, heat and washing.

The amino compounds of the present invention form salts with strong acids. When used as color bases for azo dyestuffs, the salts give the same results as the free bases and, in fact, in many cases are more convenient to use. The present invention, therefore, includes both the bases and their salts particularly salts of common acids such as hydrochloric acids.

The preferred bases of the present invention having primary amino groups may also be transformed into stabilized diazo compounds such as, for example; diazo sulfonates and diazo salts. These products may be used in various dyeing procedures in the conventional manner.

It is an advantage of the present invention that the process of producing the glycol derivatives of the present invention is not critical and can be carried out with satisfactory yields.

In general, the best results are obtained by reacting 4'-hydroxy-4-nitro diphenylamine or its 2-sulfonic acid derivative with an ester of a glycol desired. The product obtained is a nitro product which can be reduced to the preferred amino products by conventional reduction processes using ether alkaline or acidic reducing agents. When the reduction is carried out in acid solution the amino compounds are obtained in the form of their salts. If a sulfonated hydroxy nitro diphenylamine is used the sulfonic group may be removed if desired, either before or after reduction of the nitro group.

The glycol esters may be of any of the glycols having from two to four carbon atoms such as ethylene glycol, propylene glycol, 2-methyl propylene glycol, 1-methyl propylene glycol, 1-ethylethylene glycol, butylene glycols, diethylene glycol, thiodiglycol and the sulfoxide and sulfone derived therefrom. The acidic radical of the ester is not particularly critical thus for example: alkylene dihalides which are the glycol esters of hydrohalic acids may be used or glycol esters of organic acids may be employed among which paratoluene sulfonic acid is very satisfactory. The first step of the reaction is preferably carried out in the presence of strong alkalies such as caustic alkalies and it is an advantage that the process may be carried out in aqueous medium which avoids the problem of solvent recovery.

The invention will be illustrated in conjunction with the following examples which are typical. All parts are by weight unless otherwise noted.

Example 1

N,N'-bis(4''-nitrophenyl)-4,4'-aminophenyl ethylene glycol ether

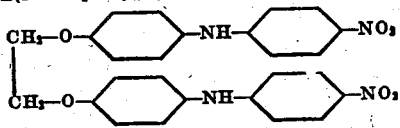

34.8 parts of potassium 4'-hydroxy-4-nitrodiphenylamine-2-sulfonate, and 6.2 parts of potassium hydroxide are dissolved in 100 parts of water, 18.5 parts of ethylene glycol di-p-toluenesulfonate are added and the mixture is heated under gentle reflux for about 6 hours. After a short time, the solution becomes opaque and a solid starts separating; the solid continues to increase in amount during refluxing. The reaction mixture is chilled, and the yellow solid is collected on a filter and dried. The crude dipotassium salt of N,N'-bis-(4''-nitro-2''-sulfophenyl)-4,4'-aminophenyl ethylene glycol ether is purified by being salted with potassium chloride from a hot aqueous solution.

A slurry of 36.1 parts of this dipotassium salt in 428 parts concentrated hydrochloric acid is heated under reflux for 19 hours. During this time, the slurry changes in color from a bright lemon yellow to an orange. After refluxing, the reaction mixture is poured into 1,000 parts of water, and the undissolved solid is collected on a filter. This solid is washed free of acid on the filter with water, and is dried. This crude product is extracted with acetone, and N,N'-bis-(4''-nitrophenyl)-4,4' - aminophenyl ethylene glycol ether is reprecipitated from the acetone by addition of water. When further purified by recrystallization from dilute dioxane, it melts at 184°–185° C.

Example 2

N,N'-bis-(4''-aminophenyl)-4,4'-aminophenyl ethylene glycol ether

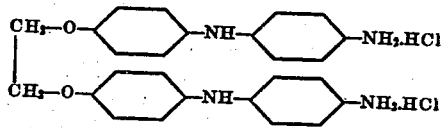

12 parts of N,N'-bis-(4''-nitrophenyl)-4,4'-aminophenyl ethylene glycol ether prepared as described in Example 1 are stirred into 136 parts of glacial acetic acid and heated to 70° C. A solution of 44.5 parts of stannous chloride dihydrate in 149 parts of concentrated hydrochloric acid is gradually added over a period of time. The reduction is allowed to proceed at a temperature of 70°-80° C. for 3½ hours at which time the solution is cooled and is treated with soda ash until it is no longer acidic to Congo red paper. It is then made strongly basic to phenolphthalein with 20% sodium hydroxide solution. The white solid which forms is collected on a filter and is then reslurried in 500 parts of water kept strongly alkaline to phenolphthalein with sodium hydroxide. This solid is recollected on a filter, and is washed with water until free of alkali. It is then slurried in approximately 400 parts of water and hydrochloric acid is added until the slurry is acidic to Congo red test paper. On heating, the solid dissolves, charcoal is added, and the solution is filtered. On chilling the filtrate, N,N'-bis-(4''-aminophenyl) - 4,4' - aminophenyl ethylene glycol ether dihydrochloride crystallizes out. It is collected on a filter and dried in a desiccator. It is purified by recrystallization from dilute hydrochloric acid.

Example 3

N,N'-bis-(4''-nitrophenyl)-4,4'-aminophenyl propylene glycol ether

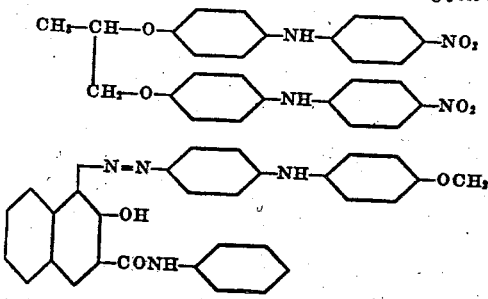

the procedure of Example 1 was followed except 19.2 parts of propylene glycol di-p-toluenesulfonate was used instead of 18.5 parts of ethylene glycol di-p-toluenesulfonate. The N,N'-bis-(4''-nitrophenyl)-4,4'-aminophenyl propylene glycol ether is obtained as an orange-yellow solid.

Example 4

N,N'-bis-(4''-aminophenyl)-4,4'-aminophenyl propylene glycol ether

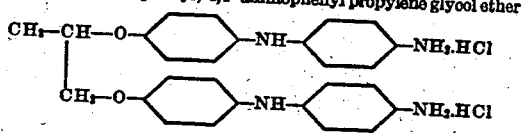

the procedure of Example 2 was followed substituting the product of Example 3 for the product of Example 1. N,N'-bis-(4''-aminophenyl)-4,4'-aminophenyl proplene glycol ether is obtained in pure form.

Example 5

A slurry of 5 parts of N,N'-bis-(4''-aminophenyl)-4,4'-aminophenyl ethylene glycol ether dihydrochloride as obtained in Example 2 in 40 parts of water and 20 parts of 17% hydrochloric acid is stirred at 40° C. while a solution of 1.6 parts of sodium nitrite in 23 parts of water is slowly added. After stirring for 10 minutes, 10 parts of sodium chloride are added and the precipitate is filtered off. The residue is reslurried in 80 parts of fresh water, is made acidic to Congo red test paper with dilute hydrochloric acid, charcoal is added and the temperature is raised to 55° C. The resulting solution is filtered and the filtrate is chilled. On additon of 8 parts of salt, a golden yellow solid precipitates which is filtered off and is dried at low temperature. The tetrazonium chloride of N,N'-bis-(4''-aminophenyl)-4,4'-aminophenyl ethylene glycol ether is a yellow solid, soluble in water.

5.4 parts of the dry tetrazonium chloride as obtained above are well mixed with 4.9 parts of magnesium sulfate dihydrate and 2.5 parts of anhydrous sodium sulfate.

0.2 part of this mixture slurried in 2.5 parts of methanol is treated with 1.5 parts of the anilide of 2-hydroxy-3-naphthoic acid in 2.5 parts of methanol and 5 parts of pyridine whereupon a blue-black paste results. This is heated 10 minutes on a steam bath, is diluted with 200 parts of water and 20% sodium hydroxide solution is run in until a basic test on phenolphthalein paper is obtained. The precipitated dyestuff is flocculated by digestion on a steam bath, is filtered off, the residue being washed with hot water, then with dilute hydrochloric acid and finally with hot water.

After drying, a blue-black, water-insoluble pigment is obtained which has the following formula:

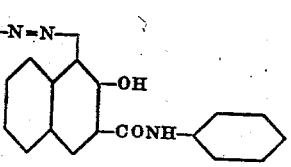

When in the above preparation, an equivalent weight of beta naphthol is substituted for the anilide of 2-hydroxy-3-naphthoic acid, a deep blue-black, water-insoluble pigment is formed which has the following formula:

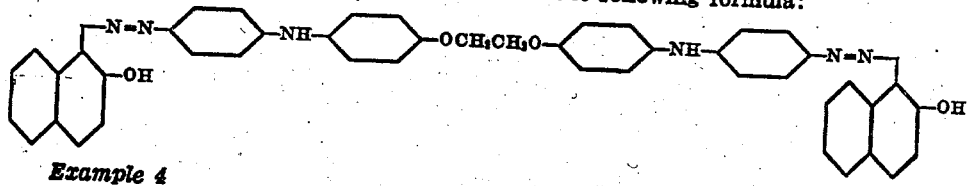

Example 6

A printing paste is prepared by dissolving 2 parts of the blended mixture of the tetrazonium chloride as made in Example 5 in 25 parts of water and adding thereto 73 parts of a suitable carbohydrate thickener.

Cotton piece goods are wetted in a warm ½% soap solution, are rinsed, passed between squeeze rolls and impregnated with the coupling component by passing through a warm solution of 5.0 parts of the anilide of 2-hydroxy-3-naphthoic acid, 5 parts of methanol, 20 parts of 20% sodium hydroxide, and 470 parts of water. After passing between squeeze rolls, the fabric is dried.

A part of the above prepared print paste is printed from an engraved copper roll upon this prepared cloth. The print is skyed and is dried at 65° C. It is then cleared at 70° C. in an alkaline bath (3% soda ash and 2% sodium hydroxide), is treated at 65° C. in a ½% soap solution, rinsed and dried.

The pattern is printed a bright blue of greenish shade.

The substitution of the beta-naphthylamide of 2-hydroxy-3-naphthoic acid for the anilide in the above alkaline grounding liquor produces an impregnated fabric which when printed upon by the remaining portion of the printing paste and when finished by a similar procedure produces a considerably deeper shade of blue.

*Example 7*

The dry mixture of the tetrazonium chloride prepared as described in Example 5 is used to produce developed dyeings on cotton fabric by the following procedure:

One half part of the dry mixture of the tetrazonium chloride is dissolved in 200 parts of water and 4 parts of 20% sodium acetate solution are added.

Cotton piece goods are separately impregnated with ice-coupling components by the procedure described in Example 6.

5 parts of the cotton piece goods so prepared are dyed in separate buffered tetrazo baths of the above composition until color development is complete. The dyeings are treated at 90° C. in an alkaline clearing bath (3% soda ash and 2% sodium hydroxide), then treated at 65° C. in a ½% soap solution, finally rinsed and dried. Some of the colors produced according to the particular ice-color coupling component taken in the alkaline grounding bath are listed below:

| Ice-color coupling component | Color |
|---|---|
| 2-hydroxy-3-naphthoic acid anilide | Strong blue. |
| 2-hydroxy-3-naphthoic acid (2'-methyl anilide) | Reddish blue. |
| Bis-(acetoacetic)-o-tolidide | Yellow-brown. |
| 2-hydroxy-3-naphthoic acid (2'-methyl-4'-chloro anilide) | Greenish blue. |
| 2-hydroxy-3-naphthoic acid (2'-naphthylamide) | Dark blue. |
| 2-hydroxy-anthracene-3-carboxylic acid (2'-methyl anilide) | Bluish green. |
| 2-hydroxy-3-naphthoic acid (2'-ethoxy anilide) | Reddish blue. |
| 2-hydroxycarbazole-3-carboxylic acid (2'-methyl anilide) | Brown. |

We claim:
1. A glycol derivative having the following formula:

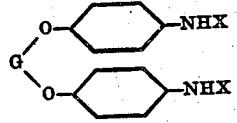

in which G is the residue of a glycol having not less than two and not more than four carbon atoms and X represents a para aminophenyl radical.

2. An ethylene glycol derivative having the following formula:

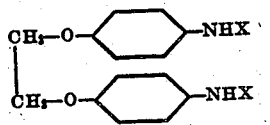

in which X represents a para aminophenyl radical.

3. A glycol derivative having the following formula:

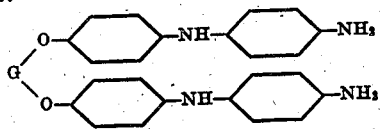

in which G is a glycol having not less than two and not more than four carbon atoms.

4. An ethylene glycol derivative having the following formula:

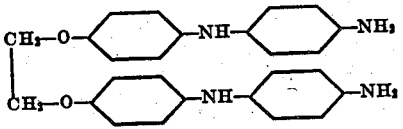

5. A salt of a compound of claim 1.
6. A salt of a compound of claim 2.
7. A salt of a compound of claim 3.
8. A salt of a compound of claim 4.
9. In a process of preparing glycol ethers of 4'-hydroxy-4-nitro diphenylamine the step which comprises reacting 4'-hydroxy-4-nitro diphenylamine-2-sulfonic acid with an ester of a glycol containing not less than two and not more than four carbon atoms in the presence of a strong alkali.
10. In a process of preparing ethylene glycol ethers of 4'-hydroxy-4-nitro diphenylamine the step which comprises reacting 4'-hydroxy-4-nitro diphenylamine-2-sulfonic acid with an ester of ethylene glycol in the presence of a strong alkali.

ROBERT P. PARKER.
JOHN J. DENTON.